(12) United States Patent
Fernandez et al.

(10) Patent No.: US 9,644,075 B2
(45) Date of Patent: May 9, 2017

(54) POLYCARBONATE COMPOSITION TO PRODUCE OPTICAL QUALITY PRODUCTS WITH HIGH QUALITY AND GOOD PROCESSABILITY

(71) Applicant: SABIC Innovative Plastics IP B.V., Bergen op Zoom (NL)

(72) Inventors: Ignacio Vic Fernandez, Santo Angel (ES); David Del Agua Hernandez, Cartagena (ES); Cornelis Jan Maria Rijken, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 199 days.

(21) Appl. No.: 14/307,793

(22) Filed: Jun. 18, 2014

(65) Prior Publication Data
US 2014/0378591 A1 Dec. 25, 2014

(30) Foreign Application Priority Data
Jun. 21, 2013 (EP) .................................. 13382236

(51) Int. Cl.
*C09D 11/02* (2014.01)
*C08J 3/20* (2006.01)
*C08K 5/11* (2006.01)
*C08L 69/00* (2006.01)
*C08G 64/30* (2006.01)

(52) U.S. Cl.
CPC .................. *C08J 3/203* (2013.01); *C08K 5/11* (2013.01); *C08L 69/00* (2013.01); *C08G 64/307* (2013.01); *C08J 2369/00* (2013.01)

(58) Field of Classification Search
CPC .............. C08L 69/00; C08K 5/10; C08K 5/11
USPC ........................................................ 524/313
See application file for complete search history.

(56) References Cited

U.S. PATENT DOCUMENTS

| | | | |
|---|---|---|---|
| 4,460,752 A | 7/1984 | Neuray et al. |
| 4,904,717 A | 2/1990 | Ho et al. |
| 5,973,102 A | 10/1999 | McCloskey et al. |
| 6,008,280 A | 12/1999 | Krishnan et al. |
| 6,359,042 B1 | 3/2002 | Anders et al. |
| 6,555,646 B2 | 4/2003 | Volkers et al. |
| 6,921,784 B2 | 7/2005 | Dohi et al. |
| 7,084,233 B2 | 8/2006 | Miyamoto et al. |

(Continued)

FOREIGN PATENT DOCUMENTS

| | | |
|---|---|---|
| CN | 102443256 A | 5/2012 |
| EP | 0732360 A1 | 9/1996 |

(Continued)

OTHER PUBLICATIONS

International Search Report for International Application No. PCT/IB2014/062336; International Filing Date: Jun. 18, 2014; Date of Mailing: Oct. 16, 2014; 4 pages.

(Continued)

*Primary Examiner* — Jane L Stanley
(74) *Attorney, Agent, or Firm* — Cantor Colburn LLP

(57) ABSTRACT

A process for manufacturing a polycarbonate composition includes melt polymerizing a dihydroxy compound and a carbonate compound in the presence of a catalyst to form a polycarbonate; and adding 1 to 400 ppm of glycerol tristearate to form the polycarbonate composition, wherein the polycarbonate composition is unquenched.

20 Claims, 2 Drawing Sheets

(56) References Cited

U.S. PATENT DOCUMENTS

| | | |
|---|---|---|
| 7,307,114 B2 | 12/2007 | Hachiya et al. |
| 7,498,401 B2 | 3/2009 | Agarwal |
| 7,786,246 B2 | 8/2010 | Jansen et al. |
| 7,999,041 B2 | 8/2011 | Goossens et al. |
| 8,133,564 B2 | 3/2012 | Kitayama |
| 8,158,747 B2 | 4/2012 | Tanabe et al. |
| 2004/0225047 A1 | 11/2004 | Hachiya et al. |
| 2005/0215750 A1 | 9/2005 | Koga et al. |
| 2007/0191518 A1 | 8/2007 | Chen et al. |
| 2010/0099832 A1 | 4/2010 | Jansen et al. |
| 2011/0128494 A1 | 6/2011 | Takahashi et al. |
| 2012/0095139 A1 | 4/2012 | Yoshida et al. |
| 2014/0093673 A1 | 4/2014 | Fernandez et al. |
| 2014/0094545 A1 | 4/2014 | Roncaglia et al. |
| 2014/0094550 A1 | 4/2014 | Diaz et al. |
| 2014/0234629 A1 | 8/2014 | Sun et al. |

FOREIGN PATENT DOCUMENTS

| | | | |
|---|---|---|---|
| EP | 1529632 A1 | 5/2005 | |
| EP | 1268606 B1 | 8/2006 | |
| EP | 2287655 A1 | 2/2011 | |
| EP | 2418253 A1 * | 2/2012 | ............. C08L 69/00 |
| EP | 2423262 A1 | 2/2012 | |
| JP | S6081245 A | 5/1985 | |
| JP | 2000143961 A | 5/2000 | |
| JP | 2001226477 A | 8/2001 | |
| JP | 2014118415 A | 6/2014 | |
| JP | 2014118416 A | 6/2014 | |
| JP | 2005068375 A | 3/2015 | |
| KR | 1019990063015 A | 8/2006 | |
| WO | 0015707 | 3/2000 | |
| WO | 0073386 A1 | 12/2000 | |
| WO | 2012141336 A1 | 10/2012 | |
| WO | 2014049575 A2 | 4/2014 | |
| WO | 2015132740 A1 | 9/2015 | |

OTHER PUBLICATIONS

Written Opinion of the International Search Report for International Application No. PCT/IB2014/062336; International Filing Date: Jun. 18, 2014; Date of Mailing: Oct. 16, 2014; 6 pages.

European Search Report for European Application No. 13382236.1; Date of Completion: Sep. 25, 2013; 5 pages.

JP2000143961 Machine Translation; Date of Publication: May 26, 2000; 10 pages.

JP 4290472 B2; Machine Translation; Date of Publication: Nov. 25, 2004; 28 pages.

CN 102443256 A; Machine Translation; Date of Publication Feb. 9, 2012; 26 pages.

CN102443256 A; Machine Translation; Date of Publication Feb. 9, 2012; 26 pages.

EP Translation of JP2000143961; Date of Publication May 26, 2000; 1 page.

JP 2000143961 A; Machine Translation; Date of Publication May 26, 2000; 20 pages.

JP 2000143961; EP Translation; Date of Publication May 26, 2000; 1 page.

Machine Translation of JP4290472 B2; Date of Issue Jul. 8, 2009; 28 pages.

PAJ Translation of JP2000143961 A; Date of Publication May 26, 2000; 21 pages.

U.S. Appl. No. 14/039,388, filed Sep. 27, 2013.
U.S. Appl. No. 14/039,492, filed Sep. 27, 2013.
U.S. Appl. No. 14/039,604, filed Sep. 27, 2013.

* cited by examiner

POLYCARBONATE COMPOSITION TO PRODUCE OPTICAL QUALITY PRODUCTS WITH HIGH QUALITY AND GOOD PROCESSABILITY

CROSS-REFERENCE TO RELATED APPLICATION

This application claims the benefit of European Patent Application Serial No. 13382236.1 filed Jun. 21, 2013. The related application is incorporated herein by reference.

TECHNICAL FIELD

This disclosure generally relates to the production of unquenched melt polycarbonate.

BACKGROUND

Melt polymerization of polycarbonate is typically achieved by reacting a bisphenol compound with a carbonate compound in a series of reactors in the presence of a catalyst. After the polymerization is complete, the catalyst is generally quenched (referred to herein as a quenched polycarbonate), and any additives are added to result in a polycarbonate composition. Polycarbonate compositions for media storage applications (such as CD, DVD, and BLU-RAY™ discs) produced by melt polycondensation processes typically experience quality issues, such as a reduction in the optical properties, when the catalyst is not quenched (referred to herein as an unquenched polycarbonate). This reduction in optical quality can ultimately reduce the applicability of unquenched polycarbonate for media storage applications.

The reduction in the optical properties in unquenched polycarbonate can occur due to the presence of active polymerization catalyst, which can catalyze the reactions between certain additives and the polycarbonate backbone. For example, mold release agents are typically added to quenched polycarbonate compositions to facilitate further processing of the resultant polycarbonate composition. In quenched polycarbonate, glycerol monostearate (GMS) and/or pentaerythritol tristearate (PETS) are typically added as the mold release agent. However, GMS molecules contain hydroxyl groups that can react with polycarbonate in the presence of an active catalyst, which results in a reduction in the optical properties such that the composition is not suitable for use as in media storage applications. PETS has been shown to have good stability in unquenched polycarbonate, but has also been shown to reduce the optical quality of discs molded therefrom.

An unquenched, melt polycarbonate composition comprising a mold release agent that could be used for media storage applications and a process of making the same is therefore desirable.

SUMMARY

Disclosed herein are methods for making melt polycarbonate compositions and systems for making melt polycarbonate compositions, and the polycarbonate composition made therefrom.

In an embodiment, a process for manufacturing a polycarbonate composition can comprise: melt polymerizing a dihydroxy compound and a carbonate compound in the presence of a catalyst to form a polycarbonate; and adding 1 to 400 ppm of glycerol tristearate to form the polycarbonate composition, wherein the polycarbonate composition is unquenched, wherein the polycarbonate has a weight average molecular weight of 8,000 to 19,000 Daltons as determined by gel permeation chromatography and based on polycarbonate standards.

The above described and other features are exemplified by the following figures and detailed description.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
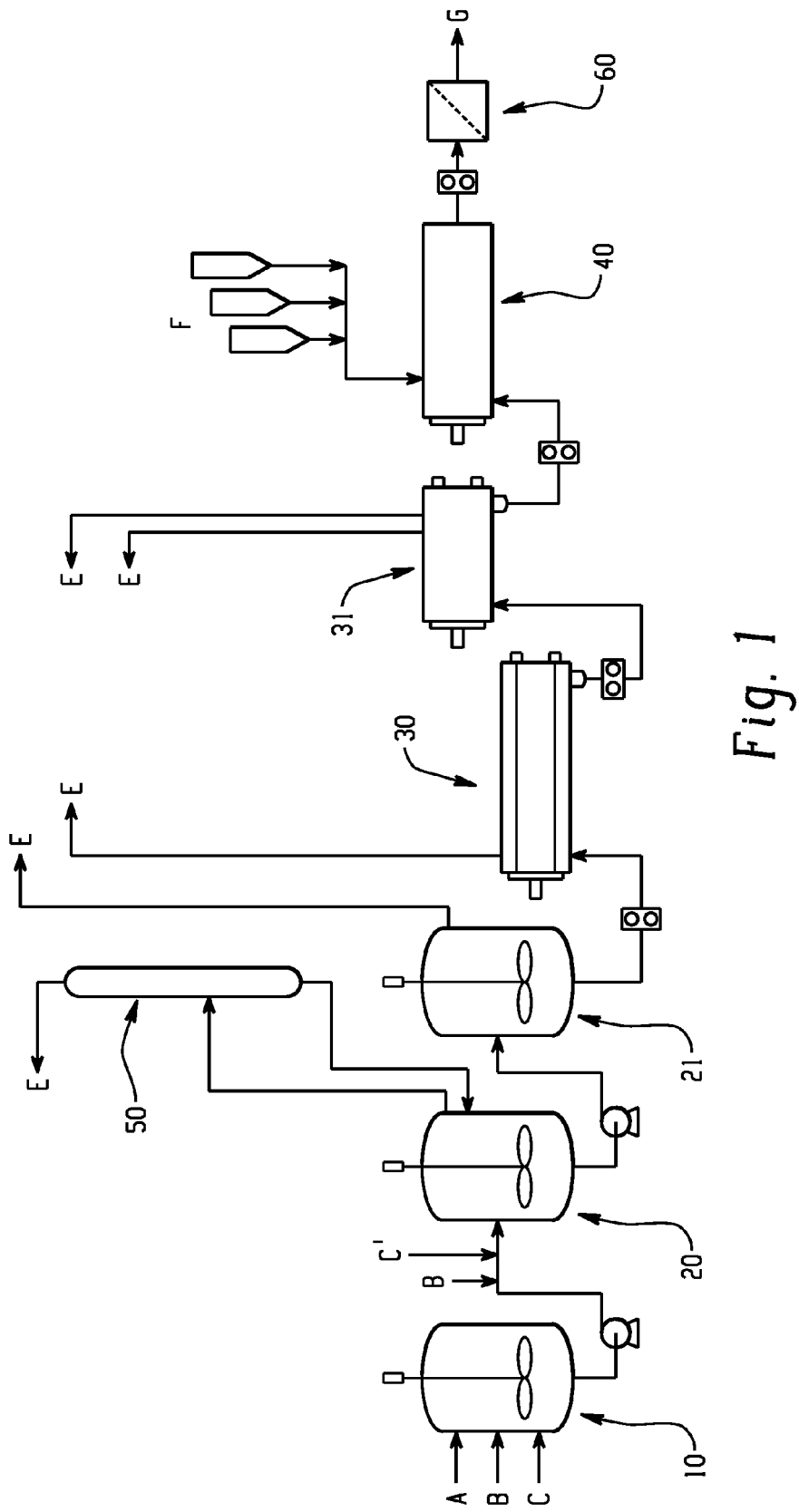
FIG. 1 schematically depicts a plant design for the production of polycarbonate where a catalyst quenching agent is not added.

Several melt polycarbonate (PC) processes stabilize polycarbonate by quenching, that is, neutralizing residual active polymerization catalyst with a quenching agent. Quenching agents are typically acidic, and differ from additives added for other purposes that may decrease catalyst activity. As is understood in the art, a "quenching agent" decreases the activity of the catalyst to prevent unwanted reactions from occurring during the final stages of manufacture, For example, when various additives are added to the polycarbonate composition. The quenching agent can minimize or prevent reactions that can occur between an additive and the polymer backbone in the presence of the active catalyst. Such reactions can result in one or more of a loss of efficiency of the additive, a change in the molecular weight of the polycarbonate, and a change in a property of the resultant polycarbonate composition (such as a reduction in the optical properties). It was surprisingly found that 1 to 400 parts per million by weight (ppm), specifically, 50 to 350 ppm, more specifically, 100 to 200 ppm of the mold release agent glycerol tristearate (GTS) can be added to an unquenched melt polycarbonate to result in an optical grade melt polycarbonate that can be used, for example, for media storage applications. This result is particularly surprising because the lifetime of the alpha catalysts often used in the melt manufacture of polycarbonates is high, and virtually the entirety of the catalyst survives the polymerization process.

As used herein, the term "unquenched polycarbonate" can include one or more of a: (1) polycarbonate composition that comprises an active catalyst; (2) a polycarbonate composition where the catalyst has not been neutralized, specifically, fully neutralized; (3) a polycarbonate composition where the reactivity between the polycarbonate and the catalyst has not been reduced; (4) a polycarbonate composition wherein the polycarbonate composition is formed without reducing the catalyst activity between the polymerization unit and the exit of the extruder by the addition of a quenching agent; (5) a polycarbonate composition wherein less than or equal to 50 mol % of an acid relative to any added alpha catalyst has been added; and (6) a polycarbonate composition where substantially no quenching agent as that term is understood in the art, specifically Lewis or Bronsted acidic compound, has been added during the manufacture of the polycarbonate.

In a specific embodiment, the term "unquenched polycarbonate" is a polycarbonate composition where substantially no quenching agent has been added during the manufacture of the polycarbonate. As stated above, a "quenching agent" is a term of art that refers to an agent added to a melt polymerized polycarbonate specifically to reduce the level of activity of the catalyst. "Quenching agents" do not include components commonly used in the manufacture of polycarbonate compositions for one purpose (e.g., as a heat stabilizer, ultraviolet light stabilizer, flame retardant, mold release agent, plasticizer, lubricant, dye, pigment, or the like) that may also have the ancillary effect of reducing catalyst activity. Thus, in a specific embodiment, the term "unquenched polycarbonate" means a polycarbonate that does not include a substantial amount of a quenching agent, for example 0 parts per million by weight (ppm) to less than 1 ppm, 0 ppm to less than 0.1 ppm, 0 ppm to less than 0.01 ppm, or 0 ppm to less than 0.001 ppm, each based on the weight of the unquenched polycarbonate. In an embodiment, no quenching agent is added.

Quenching agents include boric acid esters (e.g., $B(OCH_3)_3$, $B(OCH_2CH_3)_3$, and $B(OC_6H_6)_3$, zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O)$, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), alkyl sulfonic esters of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl (e.g., benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate, in particular alkyl tosylates such as n-butyl tosylate), sulfonic acid phosphonium salts of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivatives of the formula $A^1$-$(Y^1$—$SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula —$CR^{15}R^{16}R^{17}$, a metal cation of one equivalent, an ammonium cation (e.g., $NR^b_3^+$ wherein each $R^b$ is independently hydrogen, $C_1$-$C_{12}$ alkyl or $C_6$-$C_{18}$ aryl), or a phosphonium (e.g., $PR^b_4^+$ wherein each $R^b$ is independently hydrogen, $C_1$-$C_{12}$ alkyl or $C_6$-$C_{18}$ aryl) wherein $R^{15}$ is a hydrogen atom or an alkyl group having 1 to 5 carbon atoms, $R^{16}$ is a hydrogen atom, a phenyl group or an alky group having 1 to 5 carbon atoms, and $R^{17}$ is the same as or different from $R^{15}$ and has the same definition as $R^{15}$, provided that two of $R^{15}$, $R^{16}$ and $R^{17}$ cannot be hydrogen atoms, and in is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n$·$(R$—$Y^1$—$SO_3^-)_n$ wherein $A^3$ is a $C_1$-$C_{40}$ hydrocarbon group having a valence of n, $^+X^3$ is a secondary, tertiary or quaternary ammonium cation (e.g., $NR^b_3^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4^+$ wherein each $R^b$ is independently hydrogen, $C_1$-$C_{12}$ alkyl or $C_6$-$C_{18}$ aryl), R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$ wherein $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is 0, -($Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-A-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is hydrogen, and A is $C_1$-$C_{12}$ alkyl, $C_6$-$C_{18}$ aryl, or $C_{17}$-$C_{19}$ alkylaryl (e.g., compounds such as N-(2-hydroxyethyl) piperazine-N'-3-propanesulfonic acid, 1,4,-piperazinebis (ethanesulfonic acid), and 5-dimethylamino-1-napthalenesulfonic acid), ammonium sulfonic esters of the formula $R_aR_bR_cN^+$-A-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, and combinations comprising at least one of the foregoing. Quenching agents can include a combination of compounds, for example an alkyl tosylate such as n-butyl tosylate and phosphorus acid.

A "polycarbonate" as used herein means compositions having repeating structural carbonate units of formula (1)

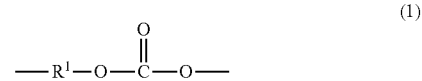
(1)

in which at least 60 percent of the total number of $R^1$ groups contain aromatic moieties and the balance thereof are aliphatic, alicyclic, or aromatic. Each $R^1$ can be a $C_{6-30}$ aromatic group, that is, contains at least one aromatic moiety. $R^1$ can be derived from a dihydroxy compound of the formula HO—$R^1$—OH, in particular of formula (2)

wherein each of $A^1$ and $A^2$ is a monocyclic divalent aromatic group and $Y^1$ is a single bond or a bridging group having one or more atoms that separate $A^1$ from $A^2$. One atom can separate $A^1$ from $A^2$. Specifically, each $R^1$ can be derived from a bisphenol of formula (3)

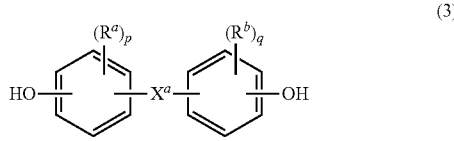

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically, para) to each other on the $C_6$ arylene group. The bridging group $X^a$ can be single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. p and q can each be 1, and $R^a$ and $R^b$ are each a $C_{1-3}$ alkyl group, specifically, methyl, disposed meta to the hydroxy group on each arylene group.

$X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexyl-methylene, ethylidene, neopentylidene, and isopropylidene, as well as 2-[2.2.1]-bicycloheptylidene, cyclohexylidene, cyclopentylidene, cyclododecylidene, and adamantylidene.

$X^a$ can be a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

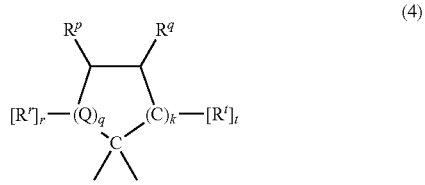

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., $R^q$ and $R^t$ taken together) can form an aromatic group or $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

Bisphenols (3) wherein $X^a$ is a substituted $C_{3-18}$ cycloalkylidene of formula (4) can be used in the manufacture of polycarbonates containing phthalimidine carbonate units of formula (1a)

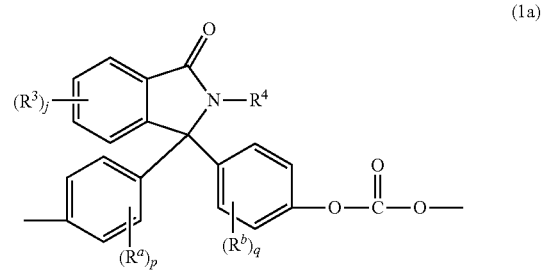

(1a)

wherein $R^a$, $R^b$, p, and q are as in formula (3), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. The phthalimidine carbonate units can be of formula (1b)

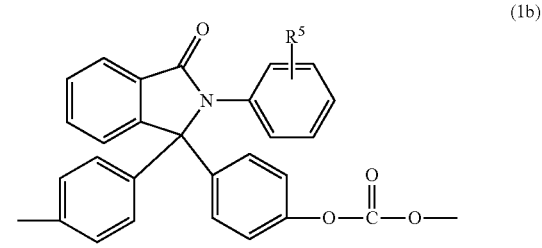

(1b)

wherein $R^5$ is hydrogen or a $C_{1-6}$ alkyl. $R^5$ can be hydrogen. Carbonate units (1a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (1c) and (1d)

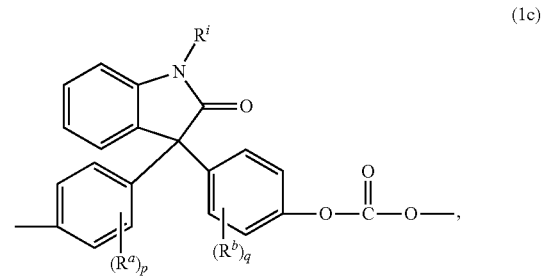

(1c)

(1d)

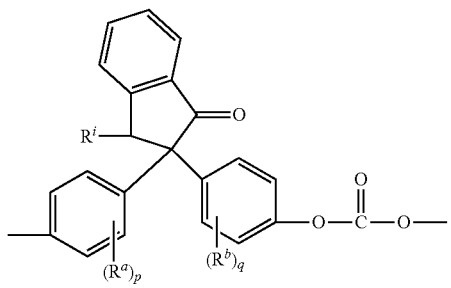

wherein $R^a$ and $R^b$ are each independently $C_{1-12}$ alkyl, p and q are each independently 0 to 4, and $R^i$ is $C_{1-12}$ alkyl, phenyl, optionally substituted with 15 to $C_{1-10}$ alkyl, or benzyl optionally substituted with 1 to 5 $C_{1-10}$ alkyl. $R^a$ and $R^b$ can each be methyl, p and q can each independently be 0 or 1, and $R^i$ can be $C_{1-4}$ alkyl or phenyl.

Examples of bisphenol carbonate units derived from bisphenols (3) wherein $X^a$ is a substituted or unsubstituted $C_{3-18}$ cycloalkylidene (4) include the cyclohexylidene-bridged, alkyl-substituted bisphenol of formula (1e)

(1e)

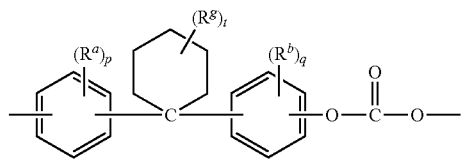

wherein $R^a$ and $R^b$ are each independently $C_{1-12}$ alkyl, $R^g$ is $C_{1-12}$ alkyl, p and q are each independently 0 to 4, and t is 0 to 10. At least one of each of $R^a$ and $R^b$ can be disposed meta to the cyclohexylidene bridging group. $R^a$ and $R^b$ can each independently be $C_{1-4}$ alkyl, $R^g$ can be $C_{1-4}$ alkyl, p and q can each be 0 or 1, and t is 0 to 5. $R^a$, $R^b$, and $R^g$ can be each methyl, r and s can be each 0 or 1, and t can be 0 or 3, specifically, 0.

Examples of other bisphenol carbonate units derived from bisphenol (3) wherein $X^a$ is a substituted or unsubstituted $C_{3-18}$ cycloalkylidene include adamantyl units (1f) and units (1g)

(1f)

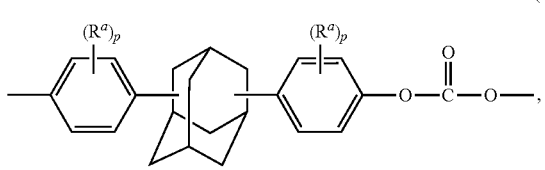

(1g)

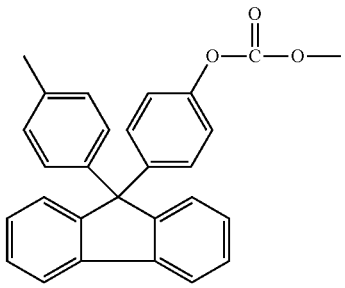

wherein $R^a$ and $R^b$ are each independently $C_{1-12}$ alkyl, and p and q are each independently 1 to 4. At least one of each of $R^a$ and $R^b$ can be disposed meta to the cycloalkylidene bridging group. $R^a$ and $R^b$ can each independently be $C_{1-3}$ alkyl, and p and q can be each 0 or 1. $R^a$, $R^b$ can be each methyl, p and q can each be 0 or 1. Carbonates containing units (1a) to (1g) are useful for making polycarbonates with high glass transition temperatures (Tg) and high heat distortion temperatures.

Other possible dihydroxy compounds of the formula HO—$R^1$—OH include compounds of formula (5)

(5)

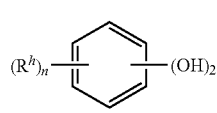

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen can be bromine.

Some illustrative examples of specific aromatic dihydroxy compounds (herein also referred to as dihydroxy reactants) include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4- hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. The polycarbonate can be a linear homopolymer derived from bisphenol A, in which each of $A^1$ and $A^2$ can be p-phenylene, and $Y^1$ can be isopropylidene in formula (3).

The diaryl carbonate can have the formula (I)

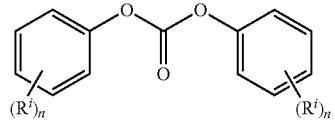

(I)

wherein n is an integer 1 to 3 and each $R_2$ is independently a linear or branched, optionally substituted $C_{1-34}$ alkyl (specifically $C_{1-6}$ alkyl, more specifically $C_{1-4}$ alkyl), $C_{1-34}$ alkoxy (specifically $C_{1-6}$ alkoxy, more specifically $C_{1-4}$ alkoxy), $C_{5-34}$ cycloalkyl, $C_{7-34}$ alkylaryl $C_{6-34}$ aryl, a halogen radical (specifically a chlorine radical), or C(=O)OR' wherein R' is H, linear or branched $C_{1-34}$ alkyl (specifically $C_{1-6}$ alkyl, more specifically $C_{1-4}$ alkyl), $C_{1-34}$ alkoxy (specifically $C_{1-16}$ alkoxy, specifically $C_{1-4}$ alkoxy), $C_{5-34}$ cycloalkyl, $C_{7-34}$ alkylaryl, or $C_{6-34}$ aryl.

The molar ratio of the diaryl carbonate to the dihydroxy compound can be greater than 1, equal to 1, or less than 1. The molar ratio of the diaryl carbonate to the dihydroxy compound can be less than 1 when expressed to at least three decimal places, for example 0.996 or less, specifically, 0.962 to 0.996, more specifically, 0.968 to 0.996, even more specifically, 0.971 and 0.994. The diaryl carbonate to dihydroxy compound can be present in a molar ratio of 2:1 to 1:2, specifically, in a molar ratio of 1.5:1 to 1:1.5, more specifically, in a molar ratio of 1.05:1 to 1:1.05, even more specifically, in a molar ratio of 1:1.

"Polycarbonates" as used herein further includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

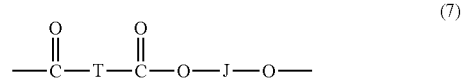

(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

J can be a $C_{2-30}$ alkylene group having a straight chain, branched chain, or cyclic (including polycyclic) structure. J can be derived from an aromatic dihydroxy compound of formula (3) above. J can be derived from an aromatic dihydroxy compound of formula (4) above. J can be derived from an aromatic dihydroxy compound of formula (5) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. J can be a $C_{2-6}$ alkylene group and T can be p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically, 10:90 to 90:10, more specifically, 25:75 to 75:25, depending on the desired properties of the final composition.

The polyester unit of a polyester-polycarbonate can be derived from the reaction of a combination of isophthalic and terephthalic diacids (or derivatives thereof) with resorcinol. The polyester unit of a polyester-polycarbonate can be derived from the reaction of a combination of isophthalic acid and terephthalic acid with bisphenol A. The polycarbonate units can be derived from bisphenol A. The polycarbonate units can be derived from resorcinol and bisphenol A in a molar ratio of resorcinol carbonate units to bisphenol A carbonate units of 1:99 to 99:1.

The polycarbonate can be made by a melt polymerization process, by co-reacting, in a molten state, monomers such as a dihydroxy reactant and a carbonate compound, such as phosgene or diphenyl carbonate. The melt polymerization process can be a batch or a continuous melt process. In either case, the melt polymerization conditions used can comprise two or more distinct reaction stages, for example, a first reaction stage in which the starting aromatic dihydroxy compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight (Mn) of 1,000 to 7,500 Daltons. In one or more subsequent polymerization stages, the number average molecular weight of the polycarbonate can be increased to 8,000 to 25,000 Daltons (using polycarbonate standard).

The polycarbonate can have a weight average molecular weight of 8,000 to 19,000 Daltons, specifically, 13,000 to 18,500 Daltons, more specifically, 13,000 to 18,000 Daltons as determined by gel permeation chromatography and based on polycarbonate standards.

The polycarbonate can have terminal hydroxyl groups in an amount of less than or equal to 20 mol %, specifically, less than or equal to 15 mol %, more specifically, less than or equal to 10 mol % based on the molar total of all terminal groups of the polycarbonate.

The polycarbonate can have a melt flow of less than or equal to 40 grams per 10 minutes (g/10 min), specifically, 4 to 40 g/10 min, specifically, 4.5 to 15 g/10 min or 15 to 35 g/10 min as determined by ASTM D1238 at 300° C., 1.5 kilograms (kg). The polycarbonate can have a melt flow of less than or equal to 10 g/10 min as determined by ASTM D1238 at 250° C., 1.5 kg.

The polycarbonate can have a light transparency of greater than 90% as determined using 3.2 mm thick samples using ASTM D1003-00, Procedure B using CIE standard illuminant C, with unidirectional viewing.

The term "melt polymerization conditions" is understood to mean those conditions necessary to affect reaction between a dihydroxy compound and a carbonate compound in the presence of a transesterification catalyst. Although, solvents are generally not used in the process, and the reactants aromatic dihydroxy compound and the carbonate compound are in a molten state, the dihydroxy compound and/or the carbonate compound can be added to the polymerization unit as a solvent mixture, such as a mixture with acetone. The reaction temperature can be 100° C. to 350° C., specifically, 180° C. to 310° C. The pressure can be at atmospheric pressure, supra-atmospheric pressure, or a range of pressures from atmospheric pressure to 15 torr in the initial stages of the reaction, and at a reduced pressure at later stages, for example, 0.2 to 15 torr. The reaction time is generally 0.1 hours to 10 hours.

A transesterification catalyst(s) can be employed in the polymerization. Such catalysts include phase transfer catalysts of formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. The catalyst can comprise a potassium sodium phosphate of the formula $NaKHPO_4$.

Catalysts used in the melt transesterification polymerization production of polycarbonates can include alpha and/or beta catalysts. Beta catalysts are typically volatile and degrade at elevated temperatures and can therefore be used at early low-temperature polymerization stages.

Possible beta catalyst(s) can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, acetate, phenoxide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used.

The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents 2 $(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of beta catalyst employed is typically based upon the total number of moles of dihydroxy compound employed in the polymerization reaction. When referring to the ratio of beta catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of beta catalyst (e.g., organic ammonium or phosphonium salts) employed typically will be $1 \times 10^{-2}$ to $1 \times 10^{-5}$, specifically, $1 \times 10^{-3}$ to $1 \times 10^{-4}$ moles per total mole of the dihydroxy compounds in the reaction mixture.

Alpha catalysts are typically more thermally stable and less volatile than beta catalysts. Nearly all of the alpha catalyst (e.g., greater than 80 wt %, specifically greater than 90%) survives the polymerization process. As such, this catalyst is available to catalyze additional (and generally unwanted) reactions downstream of the polymerization process, such as in the extruder.

The alpha catalyst can comprise a source of alkali or alkaline earth ions. The sources of these ions include alkaline earth hydroxides such as magnesium hydroxide and calcium hydroxide. Sources of alkali metal ions can include the alkali metal hydroxides such as illustrated by lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. Of these, sodium hydroxide is particularly desirable. The alpha catalyst typically will be used in an amount sufficient to provide $1 \times 10^{-2}$ to $1 \times 10^{-8}$ moles, specifically, $1 \times 10^{-4}$ to $1 \times 10^{-7}$ moles of metal hydroxide per mole of the dihydroxy compounds employed. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the alpha catalyst can comprise alkali metal salt(s) of a carboxylic acid, alkaline earth metal salt(s) of a carboxylic acid, or a combination comprising at least one of the foregoing. In another example, the alpha catalyst comprises $Na_2Mg$ EDTA or a salt thereof.

The alpha transesterification catalyst can also, or alternatively, comprise salt(s) of a non-volatile inorganic acid. For example, the alpha catalyst can comprise salt(s) of a non-volatile inorganic acid such as $NaH_2PO_3$, $NaH_2PO_4$, $Na_2HPO_3$, $NaHCO_3$, $Na_2CO_3$, $KH_2PO_4$, $CsH_2PO_4$, $Cs_2HPO_4$, $Cs_2CO_3$, and combinations comprising at least one of the foregoing. Alternatively, or in addition, the alpha transesterification catalyst can comprise mixed alkali metal salt(s) of phosphoric acid, such as $NaKHPO_4$, $CsNaHPO_4$, $CsKHPO_4$, and combinations comprising at least one of the foregoing.

Branched polycarbonate can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used. The content of the following branching structures can be less than or equal to 2,000 ppm, specifically, less than or equal to 1,000 ppm, and more specifically, less than or equal to 500 ppm.

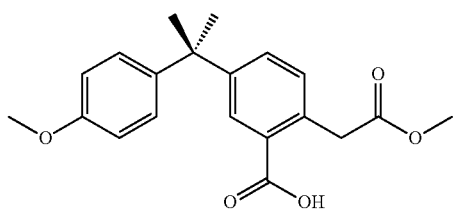

-continued

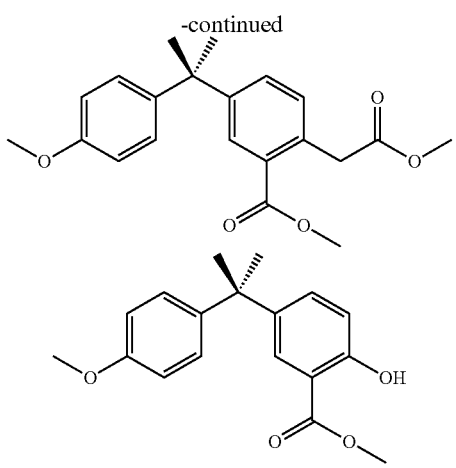

A branching agent can be employed in the polymerization and can result in an increase in polymer melt strength. The branching agent (1,1,1-tris-(hydroxyphenyl)ethane (THPE)) can be introduced to the polymerization unit, specifically, to a polymerization and/or an oligomerization vessel, as a solution of the branching agent dissolved in a branching solvent. The branching solvent selected for dissolving the branching agent can be any solvent capable of dissolving the branching agent at a level sufficient to deliver or introduce the desired amount of branching agent into the polymerization unit. The branching solvent can comprise lower alkanols, such as $C_{1-4}$ alkanols, including methanol, ethanol, propanol (such as n-propanol and isopropanol), n-butanol, or a combination comprising one or more of the foregoing.

The branching agent can be introduced in an amount such that it will result in a polycarbonate comprising up to 1.5 mole percent (mol %), specifically, up to 1.0 mol %, more specifically, up to 0.5 mol % branching agent in the final branched polycarbonate. The amount of dissolved branching agent present in the solution can be an amount of 0.5 to 50 weight percent (wt %), specifically, 5 to 40 wt %, more specifically, 15 to 35 wt % relative to the total weight of the branching agent and solvent solution. The polymerized polycarbonate can comprise a branching agent in the amount of 100 to 5,000 ppm, specifically, 500 to 4,000 ppm, more specifically, 1,000 to 3,500 ppm based on the total amount of polycarbonate repeat units.

A chainstopper can be introduced to the polymerization unit. The chainstopper can be, for example, a monofunctional phenol.

In general, melt polymerization of polycarbonate utilizes a polymerization unit that can comprise a mixer(s), a buffer vessel(s), an oligomerization vessel(s), a polymerization vessel(s), an extruder(s), a scrubber(s), a filter(s), or combinations comprising one or more of the foregoing. The melt polymerization unit can comprise a polymerization vessel, a melt filter, and an extruder, wherein the melt filter is located upstream from the extruder. The melt polymerization unit can comprise a first and a second parallel line, wherein the first parallel line is connected to the melt filter located upstream from the extruder, and wherein the second parallel line is connected to a second melt filter that is located upstream from a second extruder.

The polymerization can occur in a polymerization vessel or in a series of polymerization vessels that can have increasing temperature and vacuum. The initial polymerization vessels can be oligomerization units.

FIG. 1 illustrates a melt polycarbonate polymerization system. Initially, dihydroxy compound A and carbonate compound B can be added at a fixed molar ratio along with catalyst C, which can comprise a beta catalyst, to a premixer 10 to form a pre-mixture. Likewise, the dihydroxy compound A and carbonate compound B can be combined to form a mixture prior to addition to the pre-mixer 10.

The pre-mixer can be maintained at 160 to 180 degrees Celsius (° C.) and atmospheric pressure. The pre-mixture and any additional carbonate compound B and catalyst C', where the additional carbonate compound B and/or catalyst C' are the same or different as that added to the pre-mixer, can be sent to a first oligomerization vessel 20. The catalyst C' can comprise an alpha catalyst. The first oligomerization vessel can operate at a temperature of 230 to 260° C. and a vacuum of 140 to 200 millibar atmosphere (mbara) and phenol byproduct from polymerization reaction can be removed. The mixture can then flow into a second oligomerization vessel 21 that can operate at a higher temperature of 270 to 290° C. and a deeper vacuum of 30 to 50 mbara, e.g., for further phenol removal. The prepolymer, as formed in the oligomerization vessel, then flows to a first polymerization vessel 30 that can operate at a temperature of 290 to 315° C. and 1 to 2.5 mbara. The effluent from the first polymerization vessel can then flow to a second polymerization vessel 31 that can operate at 290 to 315° C. and 0.5 to 1.5 mbara to result in the formation of a molten polycarbonate. Phenol by-product E and any solvent can be removed, for example by a scrubber 50, from the oligomerization vessel 20, 21 and/or from the polymerization vessel 30, 31.

The polymer can then flow to an extruder 40 where an additive F, for example, a mold release agent (such as GTS) can be added to the molten polymer. The extruder 40 can be a twin-screw extruder and at least one of the components can be incorporated by feeding directly into the extruder 40 at the throat and/or downstream through, for example, a side-stuffer. Additives can also be compounded into a masterbatch with the polymer and fed into the extruder. The extruder 40 can be operated at a temperature that allows the composition to flow. After the extruder 40, the resulting product (e.g., polycarbonate composition) can optionally be pumped through a melt filter 60, e.g., a stainless steel filter and that has a 2.5 to 50 micrometer, to remove gels and other impurities from the polycarbonate composition. Likewise, the melt filter 60 can optionally be located before the extruder 40. The polycarbonate composition can then be stranded in a die-head and finally pelletized and packaged. The pellets, so prepared, when cutting the extrudate can be, for example, one-fourth inch long or less as desired. Such pellets can be used for subsequent molding, shaping, or forming Typical nominal throughput per line ranges from 2 to 15 tons per hour, specifically, 3 to 6.6 tons per hour.

The polycarbonate composition can further comprise an additive. The additive can include various additives, with the proviso that the additive(s) are selected so as to not significantly adversely affect a desired property of the thermoplastic composition. The additive can be mixed at a suitable time during the mixing of the components for forming the composition. The additive can be soluble and/or non-soluble in polycarbonate. The additive can include flow modifiers, antioxidants, heat stabilizers, light stabilizers, ultraviolet (UV) light stabilizers, UV absorbing additives, plasticizers, lubricants, release agents (such as mold release agents), antistatic agents, anti-fog agents, antimicrobial agents, colorants, surface effect additives, radiation stabilizers, flame retardants, anti-drip agents (such as TSAN), or combinations comprising one or more of the foregoing. The additive(s) can be an additive that is not acidic in nature. The total amount of additive(s) can be 0.01 to 5 wt %, based on the total weight of the composition.

Plasticizers, lubricants, and/or mold release agents can also be used. There is considerable overlap among these types of materials, which include, for example, glycerol tristearate (GTS), glycerol monostearate (GMS), pentaerythritol tetrastearate (PETS), phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. The mold release agent can comprise a polydiorganosiloxane (such as poly (dimethyl diphenyl siloxane)) having a kinematic viscosity of less than or equal to 20 millimeter squared per second (mm$^2$/sec) at 25° C. (specifically, 15 mm$^2$/sec to 20 mm$^2$/sec) determined in accordance with ASTM D445, where the polydiorganosiloxane can have a phenyl content. The thermoplastic composition can be free of stearyl stearate, where the composition can comprise less than or equal to 0.01 wt %, specifically, 0 to 0.005 wt % stearyl stearate based on the total weight of the composition.

Heat stabilizer additives include organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 parts by weight, based on 100 parts by weight of polycarbonate.

Light stabilizers and/or ultraviolet light (UV) absorbing additives, also referred to as UV stabilizers, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (UVINUL™ 3008), 6-tert-butyl-2-(5-chloro-2H-benzotriazole-2-yl)-4-methylphenyl (UVINUL™ 3026), 2,4-di-tert-butyl-6-(5-chloro-2H-benzotriazole-2-yl)-phenol (UVINUL™ 3027), 2-(2H-benzotriazole-2-yl)-4,6-di-tert-pentylphenol (UVINUL™ 3028), 2-(2H-benzotriazole-2-yl)-4-(1,1,3,3-tetramethylbutyl)-phenol (UVINUL™ 3029), 1,3-bis[(2'cyano-3',3'-diphenylacryloyl)oxy]-2,2-bis-{[(2'-cyano-3',3'-diphenylacryloyl) oxy]methyl}-propane (UVINUL™ 3030), 2-(2H-benzotriazole-2-yl)-4-methylphenol (UVINUL™ 3033), 2-(2H-benzotriazole-2-yl)-4,6-bis(1-methyl-1-phenyethyl) phenol (UVINUL™ 3034), ethyl-2-cyano-3,3-diphenylacrylate (UVINUL™ 3035), (2-ethylhexyl)-2-cyano-3,3-diphenylacrylate (UVINUL™ 3039), N,N'-bisformyl-N,N'-bis(2,2,6,6-tetramethyl-4-piperidinyl)hexamethylendiamine (UVINUL™ 4050H), bis-(2,2,6,6-tetramethyl-4-pipieridyl)-sebacate (UVINUL™ 4077H), bis-(1,2,2,6,6-pentamethyl-4-piperdiyl)-sebacate+methyl-(1,2,2,6,6-pentamethyl-4-piperidyl)-sebacate (UVINUL™ 4092H) 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; TINUVIN™ 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of polycarbonate and impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J.), and combinations comprising at least one of the foregoing. The UV stabilizers can be present in an amount of 0.01 to 1 wt %, specifically, 0.1 to 0.5 wt %, and more specifically, 0.15 to 0.4 wt %, based upon the total weight of the polycarbonate composition.

A colorant such as pigment and/or dye additives can be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The polycarbonate compositions are optical grade compositions that can have one or more the properties shown in Table A.

|  | Unit | Method | Range |
|---|---|---|---|
| Tensile Stress, yld, Type I, 50 mm/min | MPa | ASTM D 638 | 20-100 |
| Tensile Strain, yld, Type I, 50 mm/min | % | ASTM D 638 | 1-200 |
| Tensile Strain, brk, Type I, 50 mm/min | % | ASTM D 638 | 50-200 |
| Flexural Stress, yld, 1.3 mm/min, 50 mm span | MPa | ASTM D 790 | 70-130 |
| Flexural Modulus, 1.3 mm/min, 50 mm span | MPa | ASTM D 790 | 2000-28000 |
| Izod Impact, notched, 23° C. | J/m | ASTM D 256 | 400-800 |
| Falling Dart Impact (D 3029), 23° C. | J | ASTM D 3029 | 100-200 |
| Instrumented Impact Energy @ peak, 23° C. | J | ASTM D 3763 | 30-100 |
| Vicat Softening Temp, Rate B/50 | ° C. | ASTM D 1525 | 140-170 |
| HDT, 0.45 MPa, 6.4 mm, unannealed | ° C. | ASTM D 648 | 110-160 |
| HDT, 1.82 MPa, 6.4 mm, unannealed | ° C. | ASTM D 648 | 110-150 |
| Specific Gravity | — | ASTM D 792 | 1.0-1.4 |
| Water Absorption, 24 hours | % | ASTM D 570 | 0-0.2 |
| Melt Flow Rate, 300° C./1.2 kg | g/10 min | ASTM D 1238 | 2-40 |

In addition, the polycarbonate compositions can be optical-grade. Optical-grade materials are transparent and have a small optical distortion. For example, optical grade polycarbonates can have a haze of less than 1%, less than 0.5%, or less than 0.1%, tested in accordance with ASTM D1003-00, Procedure B, illuminant C, on a spectrophotometer, at a thickness of 3.2 mm.

Shaped, formed, or molded articles comprising the polycarbonate compositions are also provided. The polycarbonate compositions can be molded into useful shaped articles by a variety of means such as injection molding, extrusion, rotational molding, blow molding, and thermoforming. Formed articles comprising the polycarbonate composition are particularly useful in optical applications and can be formed into articles such as windows, glazings, or media storage devices (such as CDs, DVDs, and BLU-RAY™ discs).

In summary, a process for manufacturing a polycarbonate composition comprises melt polymerizing a dihydroxy compound such as bisphenol A and a carbonate compound such as diphenyl carbonate in the presence of a catalyst to form a polycarbonate, and adding 1 to 400 ppm, 1 to 200 ppm, or 1 to 150 ppm of glycerol tristearate to form the polycarbonate composition, wherein the polycarbonate composition is unquenched (for example, at least one of (1) the polycarbonate composition comprises an active catalyst; (2) the catalyst has not been neutralized; (3) the reactivity between the polycarbonate and the catalyst has not been reduced; (4) the polycarbonate composition is formed without reducing the catalyst activity between the polymerization unit and the exit of the extruder by the addition of a quenching agent; (5) less than or equal to 50 mol % of an acid relative to any added alpha catalyst has been added; and (6) substantially no quenching agent has been added during the manufacture of the polycarbonate); and more particularly adding a dihydroxy compound such as bisphenol A and a carbonate compound such as diphenyl carbonate and a catalyst to a mixer, oligomerizing the dihydroxy compound and the carbonate compound to form an oligomer, melt polymerizing the oligomer to form a polymer in a polymerization unit, and adding 1 to 400 ppm, 1 to 200 ppm, or 1 to 150 ppm of glycerol tristearate and any additives to the polymer to form the polycarbonate composition, wherein substantially no quenching agent, preferably 0 ppm of a quenching agent, is added during the process, examples of quenching agents including a boric acid ester, zinc borate, boron phosphate, aluminum stearate, aluminum silicate, zirconium carbonate, zirconium $C_1$-$C_{12}$ alkoxides, zirconium hydroxycarboxylate, gallium phosphide, gallium antimonide, germanium oxide, $C_1$-$C_{32}$ organogermanium compound, $C_4$-$C_{32}$ tetraorganotin compound, $C_4$-$C_{32}$ hexaorganotin compound, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfate, alkyl sulfonic ester of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl, sulfonic acid phosphonium salt of the formula $(R^aSO_3^-)$ $(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivative of the formula $A^1$-$(Y^1—SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula $CR^{15}R^{16}R^{17}$, a metal cation of one equivalent, an ammonium cation or a phosphonium wherein $R^{15}$ is a hydrogen atom or an alkyl group having 1 to 5 carbon atoms, $R^{16}$ is a hydrogen atom, a phenyl group or an alky group having 1 to 5 carbon atoms, and $R^{17}$ is the same as or different from $R^{15}$ and has the same definition as $R^{15}$, provided that two of $R^{15}$, $R^{16}$ and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary, tertiary or quaternary phosphonium cation, and $Y^1$ is a single bond or an oxygen atom, a compound of the formula $A^3$-$(^+X^3)_n$.$(R—Y^1—SO_3^-)_n$ wherein $A^3$ is a $C_1$-$C_{40}$ hydrocarbon group having a valence of n, $^+X^3$ is a secondary, tertiary or quaternary ammonium cation or a secondary, tertiary or quaternary phosphonium cation, R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$ wherein $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is O, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-A-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N, $R_c$ is hydrogen, and A is $C_1$-$C_{12}$ alkyl, $C_6$-$C_{18}$ aryl, or $C_{17}$-$C_{19}$ alkylaryl, ammonium sulfonic esters of the formula $R_aR_bR_cN^+$-A-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N, $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, or a combination comprising at least one of the foregoing quenching agent.

Optionally in any of the foregoing methods an additive can be added, wherein the additive comprises a colorant, a heat stabilizer, an antioxidant, a UV absorbing additive, an antistatic agent, a flow modifier, an anti-fog additive, an antimicrobial agent, a flame retardant, or a combination comprising one or more of the foregoing, preferably wherein the additive is not acidic. Any of the foregoing methods can further optionally comprise comprising extruding, filtering, and pelletizing the polycarbonate composition to form polycarbonate pellets, wherein the glycerol tristearate can optionally added to the extruder during extruding the polycarbonate composition.

Unquenched polycarbonate compositions formed by any of the foregoing methods can have a haze of less than 1%, less than 0.5%, or less than 0.1%, tested in accordance with ASTM D1003-00, Procedure B, illuminant C, on a spectrophotometer, at a thickness of 3.2 mm, and can be used to manufacture an article, for example by molding. Exemplary articles include a DVD, a CD, or a Blu-ray disc.

The following examples are provided to illustrate the method of preparing the polycarbonate. The examples are merely illustrative and are not intended to limit methods made in accordance with the disclosure to the materials, conditions, or process parameters set forth therein.

EXAMPLES

Experiments were run in a continuous melt polycarbonate plant as illustrated in FIG. 1. In the experiments, 39.8 kilograms per hour (kg/h) BPA and 37.3 kg/h of DPC and an endcapping agent were fed into a continuously stirred pre-mixer 10, where pre-mixer 10 was operated at atmospheric pressure, and a temperature of 160 to 180° C. A 3.2 wt % aqueous solution of tetrabutyl phosphonium acetate was also added to the pre-mixer at a rate of 75 to 95 milliliters per hour (mL/h).

The outlet stream of the pre-mixer 10 was then pumped to a continuously stirred first oligomerization vessel 20, which was operated at 240 to 270° C. and 150 to 200 millibar atmosphere (mbara) vacuum. A vapor phase containing phenol and unreacted monomers BPA and DPC was removed from the oligomerization vessel 20 and was continuously distilled in a scrubber 50 where the reflux ratio was adjusted so that the column head temperature was 125 to 130° C. to yield high purity phenol. Unreacted BPA and DPC were recycled back into the oligomerization vessel 20. Additional DPC was added to the oligomerization vessel 20 at a rate of 0.9 to 1.35 kg/h in order to compensate for DPC losses in the phenol overhead streams of the forthcoming reactors. An aqueous stream of 50 ppm NaOH was also added in the oligomerization vessel 20 at a flowrate of 0.255 to 0.8 milliliters per minute (mL/min).

The outlet stream of the oligomerization vessel 20 was then pumped to a second oligomerization vessel 21, where the oligomerization vessel 21 was operated at 270 to 285° C. and 35-40 mbara vacuum. Due to the higher viscosity of the outlet stream of oligomerization vessel 21, a gear pump (not shown) was used to convey the outlet stream to the first polymerization vessel 30. Polymerization vessel 30 was operated at 285 to 302° C. and 2.5 to 3.0 mbara vacuum. The polymer stream exiting polymerization vessel 30 was then pumped to a second polymerization vessel 31, that was operated at a deeper vacuum of 1.0 to 1.5 mbara and 285 to 305° C. Phenol was removed from oligomerization vessel 21 and polymerization vessels 30 and 31.

The resultant polycarbonate had a weight average molecular weight of 36,500 Daltons based on polystyrene standards, a minimum endcap ratio of 80%, and a branching level of 1,000 ppm. It is noted that a quenching agent was not added to the polycarbonate and that any remaining catalyst was still active. The polymerized polycarbonate was introduced to a twin-screw extruder 40, where additives as described in Table 1 were added.

TABLE 1

| Additive | 1 | 2 | 3 | 4 | 5 | 6 | 7 | 8 | 9 |
|---|---|---|---|---|---|---|---|---|---|
| GMS (ppm) | 400 | 0 | 0 | 0 | 400 | 0 | 400 | 0 | 0 |
| PETS (ppm) | 220 | 100 | 220 | 400 | 0 | 0 | 125 | 0 | 0 |
| Irgafos 168 (ppm) | 220 | 220 | 220 | 220 | 220 | 220 | 220 | 220 | 220 |
| GTS (ppm) | 0 | 0 | 0 | 0 | 0 | 400 | 0 | 190 | 120 |

The resultant mixture was then filtered in filter 60 and pelletized. 70 total discs were made from each of Examples 1-9 using the conditions as described in Table 2, where 10 discs were made per condition.

TABLE 2

|  | 1 | 2 | 3 | 4 | 5 | 6 | 7 |
|---|---|---|---|---|---|---|---|
| Barrel T (° C.) | 335 | 360 | 380 | 360 | 360 | 335 | 335 |
| Mold T (° C.) | 38/44 | 38/44 | 38/44 | 38/44 | 48/54 | 48/54 | 38/44 |

A "cloud level" was assigned to each disc. No clouds received a score of 1, low or hardly visible clouds received a score of 2, some clouds received a score of 3, clouds received a score of 4, severe clouds received a score of 5, and very severe clouds received a score of 6. The cloud level of each of the 10 discs for each testing condition of each composition was averaged together and the 7 averaged scores for each composition were added together to obtain a final cloud level for a maximum cloud level of 42 and a minimum cloud level of 7. The resulting maximum cloud levels are shown in FIG. 2, where Example 10 is an unquenched, commercially available sample of an optical quality grade for media storage polycarbonate, SABIC™ PC4800, commercially available from SABIC's Innovative Plastics business and Example 11 is a quenched, commercially available sample of an optical quality grade for media storage polycarbonate, LEXAN™ OQ1028, commercially available from SABIC's Innovative Plastics business.

Figure 2:
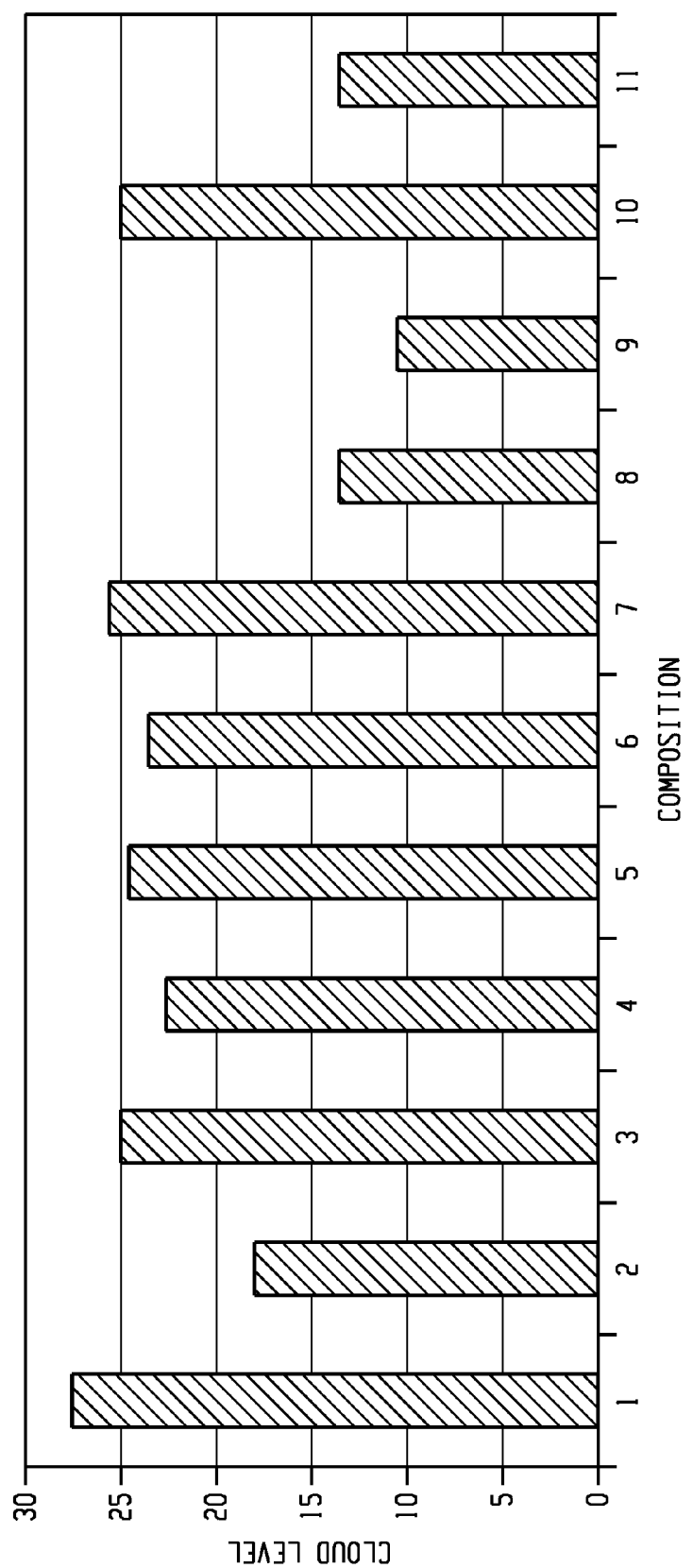
FIG. 2 is a graphical illustration of the resultant cloud level of Examples 1-11.

FIG. 2 shows that unquenched Examples 8 and 9 that comprised less than 400 ppm of GTS resulted in cloud levels of less than or equal to the quenched optical quality grade polycarbonate of Example 11. FIG. 2 also shows that Example 2 that had 100 ppm of PETS resulted in a relatively low cloud level in unquenched polycarbonate. However, as noted above, use of PETS can also reduce other optical qualities of discs, such as color, and therefore is not as desirable as GTS in an amount of less than 400 ppm, and even more preferably less than 200 ppm. It is also notable that as shown in Example 9 vs. Example 11, amounts of GTS less than 150 ppm give better results than the unquenched composition. In addition, Examples 6, 8, and 9 can have a haze of less than 1%, less than 0.5%, or less than 0.1%, tested in accordance with ASTM D1003-00, Procedure B, illuminant C, on a spectrophotometer, at a thickness of 3.2 mm.

Set forth below are some embodiments of the present method of manufacturing a polycarbonate composition.

Embodiment 1 a process for manufacturing a polycarbonate composition comprising: melt polymerizing a dihydroxy compound and a carbonate compound in the presence of a catalyst to form a polycarbonate; and adding 1 to 400 ppm of glycerol tristearate to form the polycarbonate composition, wherein the polycarbonate composition is unquenched, wherein the polycarbonate has a weight average molecular weight of 8,000 to 19,000 Daltons as determined by gel permeation chromatography and based on polycarbonate standards.

Embodiment 2

The process of Embodiment 1, comprising adding 1 to 200 ppm of the glycerol tristearate.

Embodiment 3

The process of Embodiment 2, comprising adding 1 to 150 ppm of the glycerol tristearate.

Embodiment 4

The process of any one of Embodiments 1 to 3, wherein one or more of the following conditions apply: (1) the polycarbonate composition comprises an active catalyst; (2) the catalyst has not been neutralized; (3) the reactivity between the polycarbonate and the catalyst has not been reduced; (4) the polycarbonate composition is formed without reducing the catalyst activity between the polymerization unit and the exit of the extruder by the addition of a quenching agent; (5) less than or equal to 50 mol % of an acid relative to any added alpha catalyst has been added; and (6) substantially no quenching agent has been added during the manufacture of the polycarbonate.

Embodiment 5

A process for manufacturing a polycarbonate composition comprising: adding a dihydroxy compound, a carbonate compound, and a catalyst to a mixer; oligomerizing the dihydroxy compound and the carbonate compound to form an oligomer; melt polymerizing the oligomer to form a polymer in a polymerization unit, adding 1 to 400 ppm of glycerol tristearate and any additives to the polymer to form the polycarbonate composition; wherein substantially no quenching agent is added during the process, wherein the polycarbonate has a weight average molecular weight of 8,000 to 19,000 Daltons as determined by gel permeation chromatography and based on polycarbonate standards.

Embodiment 6

The process of any one of Embodiments 1 to 5, wherein 0 ppm of any quenching agent is added during the process.

Embodiment 7

The process of Embodiment 6, wherein the quenching agent is a boric acid ester, zinc borate, boron phosphate, aluminum stearate, aluminum silicate, zirconium carbonate, zirconium $C_1$-$C_{12}$ alkoxides, zirconium hydroxycarboxylate, gallium phosphide, gallium antimonide, germanium oxide, $C_1$-$C_{32}$ organogermanium compound, $C_4$-$C_{32}$ tetraorganotin compound, $C_4$-$C_{32}$ hexaorganotin compound, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfate, alkyl sulfonic ester of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl, sulfonic acid phosphonium salt of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivative of the formula $A^1$-$(Y^1$—$SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula $CR^{15}R^{16}R^{17}$, a metal cation of one equivalent, an ammonium cation or a phosphonium wherein $R^{15}$ is a hydrogen atom or an alkyl group having 1 to 5 carbon atoms, $R^{16}$ is a hydrogen atom, a phenyl group or an alky group having 1 to 5 carbon atoms, and $R^{17}$ is the same as or different from $R^{15}$ and has the same definition as $R^{15}$, provided that two of $R^{15}$, $R^{16}$ and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary, tertiary or quaternary phosphonium cation, and $Y^1$ is a single bond or an oxygen atom, a compound of the formula $A^3$-$(^+X^3)_n \cdot (R$—$Y^1$—$SO_3^-)_n$ wherein $A^3$ is a $C_1$-$C_{40}$ hydrocarbon group having a valence of n, $^+X^3$ is a secondary, tertiary or quaternary ammonium cation or a secondary, tertiary or quaternary phosphonium cation, R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$, wherein $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is 0, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-$A$-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N, $R_c$ is hydrogen, and A is $C_1$-$C_{12}$ alkyl, $C_6$-$C_{18}$ aryl, or $C_{17}$-$C_{19}$ alkylaryl, ammonium sulfonic esters of the formula $R_aR_bR_cN^+$-$A$-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N, $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, or a combination comprising at least one of the foregoing quenching agent.

Embodiment 8

The process of any one of Embodiments 1 to 7, further comprising adding an additive, wherein the additive comprises a colorant, a heat stabilizer, an antioxidant, a UV absorbing additive, an antistatic agent, a flow modifier, an anti-fog additive, an antimicrobial agent, a flame retardant, or a combination comprising one or more of the foregoing.

Embodiment 9

The process of Embodiment 8, wherein the additive is not acidic.

Embodiment 10

The process of any one of Embodiments 1 to 9, wherein the molecular weight is 13,000 to 18,500 Daltons.

Embodiment 11

The process of any one of Embodiments 1 to 10, wherein the molecular weight is 13,000 to 18,000 Daltons.

Embodiment 12

The process of any one of Embodiments 1 to 11, wherein the polycarbonate has terminal hydroxyl groups in an amount of less than or equal to 20 mol % based on the molar total of all terminal groups of the polycarbonate.

Embodiment 13

The process of any one of Embodiments 1 to 12, wherein the polycarbonate has a melt flow of less than or equal to 40 grams per 10 minutes (g/10 min) as determined by ASTM D1238 at 250° C., 1.5 kg.

Embodiment 14

The process of Embodiment 13, wherein the melt flow is less than or equal to 10 g/10 min.

Embodiment 15

The process of Embodiment 14, wherein the melt flow is 4 to 10 g/10 min.

Embodiment 16

The process of any one of Embodiments 1 to 15, wherein a branching structure is present in an amount of less than or equal to 2,000 ppm.

Embodiment 17

The process of Embodiments 16, wherein the branching structure is present in an amount of less than or equal to 500 ppm.

Embodiment 18

The process of any one of Embodiments 1 to 17, wherein the polycarbonate composition is free of stearyl stearate.

Embodiment 19

The process of any one of Embodiments 1 to 18, further comprising extruding, filtering, and pelletizing the polycarbonate composition to form polycarbonate pellets.

Embodiment 20

The process of Embodiment 19, wherein the glycerol tristearate is added to the extruder during extruding the polycarbonate composition.

Embodiment 21

An unquenched polycarbonate composition formed by any one of Embodiments 1 to 20.

Embodiment 22

The unquenched polycarbonate composition of Embodiment 21, having a haze of less than 1%, tested in accordance with ASTM D1003-00, Procedure B, illuminant C, on a spectrophotometer, at a thickness of 3.2 mm.

Embodiment 23

The unquenched polycarbonate composition of any one of Embodiments 21 to 22, having a light transparency of greater than 90% as determined using 3.2 mm thick samples using ASTM D1003-00, Procedure B using CIE standard illuminant C, with unidirectional viewing.

Embodiment 24

A process of forming an article, comprising molding the polycarbonate pellets of any of Embodiments 19 and 20 into an article.

Embodiment 25

The process of Embodiment 24, wherein the article is a DVD, a CD, or a Blu-ray disc.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A process for manufacturing a polycarbonate composition comprising:
    melt polymerizing a dihydroxy compound and a carbonate compound in the presence of a catalyst comprising a source of alkali or alkaline earth ions to form a polycarbonate; and
    adding 1 to 190 ppm of glycerol tristearate to form the polycarbonate composition, wherein the polycarbonate composition is unquenched,
    wherein the polycarbonate has a weight average molecular weight of 8,000 to 19,000 Daltons as determined by gel permeation chromatography and based on polycarbonate standards.

2. The process of claim 1, wherein the molecular weight is 13,000 to 18,500 Daltons.

3. The process of claim 2, comprising adding 1 to 150 ppm of the glycerol tristearate.

4. The process of claim 1, wherein one or more of the following conditions apply: (1) the polycarbonate composition comprises an active catalyst; (2) the catalyst has not been neutralized; (3) the reactivity between the polycarbonate and the catalyst has not been reduced; (4) the polycarbonate composition is formed without reducing the catalyst activity between the polymerization unit and the exit of the extruder by the addition of a quenching agent; (5) less than or equal to 50 mol % of an acid relative to any added alpha catalyst has been added; and (6) substantially no quenching agent has been added during the manufacture of the polycarbonate.

5. The process of claim 1, wherein 0 ppm of any quenching agent is added during the process.

6. The process of claim 5, wherein the quenching agent is a boric acid ester, zinc borate, boron phosphate, aluminum stearate, aluminum silicate, zirconium carbonate, zirconium $C_1$-$C_{12}$ alkoxides, zirconium hydroxycarboxylate, gallium phosphide, gallium antimonide, germanium oxide, $C_1$-$C_{32}$ organogermanium compound, $C_4$-$C_{32}$ tetraorganotin compound, $C_4$-$C_{32}$ hexaorganotin compound, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, titanium oxide, phosphoric acid, phosphorous acid, hypophosphorous acid, pyrophosphoric acid, polyphosphoric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, an alkyl sulfonic ester, a sulfonic acid phosphonium salt, a sulfonic acid derivative, a compound of the formula $^+X^2$-$A^2$-$Y^1$—$SO_3^-$, a compound of the formula $A^3$-$(^+X^3)_n \cdot (R$—$Y^1$—$SO_3^-)_n$, a compound of the formula $A^3$-$(^+X^3)_n \cdot (R$—$Y^1$—$SO_3^-)_n$, a compound of the formula $A^5$-$Ad^1$-$A^4$-$(Ad^2$-$A^5)_l$, an aminosulfonic ester, an ammonium sulfonic ester, sulfonated polystyrene, methyl acrylate-sulfonated styrene copolymer, or a combination comprising at least one of the foregoing quenching agents;

wherein the alkyl sulfonic ester is of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkyaryl;

wherein the sulfonic acid phosphonium salt is of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl, or $C_6$-$C_{18}$ aryl;

wherein the sulfonic acid derivative is of the formula $A^1$-$(Y^1$—$SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula —$CR^{15}R^{16}R^{17}$, a metal cation of one equivalent, an ammonium cation or a phosphonium wherein $R^{15}$ is a hydrogen atom or an alkyl group having 1 to 5 carbon atoms, $R^{16}$ is a hydrogen atom, a phenyl group or an alky group having 1 to 5 carbon atoms, and $R^{17}$ is the same as or different from $R^{15}$ and has the same definition as $R^{15}$, provided that two of $R^{15}$, $R^{16}$ and $R^{17}$ cannot be hydrogen atoms, and m is an integer of 1 to 4, provided that when $Y^1$ is a single bond, all of $X^1$ in an amount of m cannot be metal cations of one equivalent;

wherein, in the compound of the formula $^+X^2$-$A^2$-$Y^1$—$SO_3^-$, $A^2$ is a divalent hydrocarbon group, $^+X^2$ is a secondary, tertiary or quaternary ammonium cation or a secondary, tertiary or quaternary phosphonium cation, and $Y^1$ is a single bond or an oxygen atom;

wherein, in the compound of the formula $A^3$-$(^+X^3)_n \cdot (R$—$Y^1$—$SO_3^-)_n$, $A^3$ is a $C_1$-$C_{40}$ hydrocarbon group having a valence of n, $^+X^3$ is a secondary, tertiary or quaternary ammonium cation or a secondary, tertiary or quaternary phosphonium cation, R is a monovalent $C_1$-$C_{40}$ hydrocarbon group, n is an integer of 2 to 4, and $Y^1$ is a single bond or an oxygen atom;

wherein, in the compound of the formula $A^5$-$Ad^1$-$A^4$-$(Ad^2$-$A^5)_l$, $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is 0, -$(Ad^2$-$A^5)_l$ is a hydrogen atom or a bond between $A^4$ and $A^5$, in which $A^5$ is a divalent hydrocarbon group or a single bond;

wherein the aminosulfonic ester is of the formula $R_aR_bN$-$A$-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N, $R_c$ is hydrogen, and A is $C_1$-$C_{12}$ alkyl, $C_6$-$C_{18}$ aryl, or $C_{17}$-$C_{19}$ alkylaryl; and wherein the ammonium sulfonic ester is of the formula $R_aR_bR_cN^+$-$A$-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N, $R_c$ is a hydrogen, and A is $C_1$-$C_{12}$ alkyl, $C_6$-$C_{18}$ aryl, or $C_7$-$C_{19}$ alkylaryl.

7. The process of claim 1, further comprising adding an additive, wherein the additive comprises a colorant, a heat stabilizer, an antioxidant, a UV absorbing additive, an antistatic agent, a flow modifier, an anti-fog additive, an antimicrobial agent, a flame retardant, or a combination comprising one or more of the foregoing.

8. The process of claim 7, wherein the additive is not acidic.

9. The process of claim 1, further comprising extruding, filtering, and pelletizing the polycarbonate composition to form polycarbonate pellets.

10. A process of forming an article, comprising molding the polycarbonate pellets of claim 9 into an article.

11. The process of claim 10, wherein the article is a DVD, a CD, or a Blu-ray disc.

12. An unquenched polycarbonate composition formed by the process of claim 1.

13. The unquenched polycarbonate composition of claim 12, having a haze of less than 1%, tested in accordance with ASTM D1003-00, Procedure B, illuminant C, on a spectrophotometer, at a thickness of 3.2 mm.

14. The process of claim 1, wherein the weight average molecular weight is 13,000 to 18,000 Daltons; wherein the process comprises adding 1 to 150 ppm of the glycerol tristearate; wherein an article formed from the polycarbonate composition that is unquenched has a haze of less than 1%, tested in accordance with ASTM D1003-00, Procedure B, illuminant C, on a spectrophotometer, at a thickness of 3.2 mm.

15. A process for manufacturing a polycarbonate composition comprising:

melt polymerizing a dihydroxy compound and a carbonate compound in the presence of a catalyst comprising a source of alkali or alkaline earth ions to form a polycarbonate; and adding 1 to 190 ppm of glycerol tristearate to form the polycarbonate composition, wherein the polycarbonate composition is unquenched such that 0 ppm of any quenching agent is added during the process, wherein the polycarbonate has a weight average molecular weight of 8,000 to 19,000 Daltons as determined by gel permeation chromatography and based on polycarbonate standards.

16. A process for manufacturing a polycarbonate composition comprising:

adding a dihydroxy compound, a carbonate compound, and a catalyst comprising a source of alkali or alkaline earth ions to a mixer;

oligomerizing the dihydroxy compound and the carbonate compound to form an oligomer;

melt polymerizing the oligomer to form a polymer in a polymerization unit, adding 1 to 190 ppm of glycerol tristearate and any additives to the polymer to form the polycarbonate composition;

wherein substantially no quenching agent is added during the process, wherein the polycarbonate has a weight average molecular weight of 8,000 to 19,000 Daltons as determined by gel permeation chromatography and based on polycarbonate standards.

17. The process of claim 16, wherein one or more of the following conditions apply: (1) the polycarbonate composition comprises an active catalyst; (2) the catalyst has not been neutralized; (3) the reactivity between the polycarbonate and the catalyst has not been reduced; (4) the polycarbonate composition is formed without reducing the catalyst activity between the polymerization unit and the exit of the extruder by the addition of a quenching agent; (5) less than or equal to 50 mol % of an acid relative to any added alpha catalyst has been added; and (6) substantially no quenching agent has been added during the manufacture of the polycarbonate.

18. The process of claim 16, comprising adding 1 to 150 ppm of the glycerol tristearate.

19. The process of claim 16, wherein 0 ppm of any quenching agent is added during the process.

20. The process of claim 15, wherein the molecular weight is 13,000 to 18,500 Daltons.

* * * * *